(12) United States Patent
Takahashi

(10) Patent No.: US 8,709,665 B2
(45) Date of Patent: Apr. 29, 2014

(54) NONAQUEOUS SECONDARY BATTERY WITH NITRILE GROUP-CONTAINING COMPOUND

(75) Inventor: Kentaro Takahashi, Sumoto (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 571 days.

(21) Appl. No.: 12/964,870

(22) Filed: Dec. 10, 2010

(65) Prior Publication Data

US 2011/0159359 A1 Jun. 30, 2011

(30) Foreign Application Priority Data

Dec. 25, 2009 (JP) ................................. 2009-295907

(51) Int. Cl.
*H01M 6/16* (2006.01)
*H01M 4/13* (2010.01)
*H01M 4/60* (2006.01)
*H01M 4/58* (2010.01)

(52) U.S. Cl.
USPC ........ 429/339; 429/212; 429/217; 429/218.1; 429/341

(58) Field of Classification Search
USPC ................ 429/339, 341, 342, 343, 212, 217, 429/218.1
See application file for complete search history.

(56) References Cited

U.S. PATENT DOCUMENTS

| | | | |
|---|---|---|---|
| 5,110,392 A * | 5/1992 | Ito et al. ........................ | 156/314 |
| 6,337,132 B1 | 1/2002 | Kajiyama et al. | |
| 8,415,058 B2 * | 4/2013 | Sakata et al. .................. | 429/339 |
| 2008/0102369 A1 | 5/2008 | Sakata et al. | |
| 2009/0136854 A1 | 5/2009 | Nakura | |
| 2009/0214938 A1 | 8/2009 | Yamamoto et al. | |
| 2010/0035146 A1 | 2/2010 | Fujii et al. | |

FOREIGN PATENT DOCUMENTS

| | | |
|---|---|---|
| CN | 101170201 A | 4/2008 |
| JP | 9-199112 A | 7/1997 |
| JP | 2000-281354 A | 10/2000 |
| JP | 2002-319405 A | 10/2002 |
| JP | 2007-18874 A | 1/2007 |
| JP | 2007-242303 A | 9/2007 |
| JP | 2007-280830 A | 10/2007 |
| JP | 2009-032653 A | 2/2009 |
| JP | 2009-158464 A | 7/2009 |
| JP | 2009-231261 A | 10/2009 |

* cited by examiner

*Primary Examiner* — Patrick Ryan
*Assistant Examiner* — Julian Anthony
(74) *Attorney, Agent, or Firm* — Westerman, Hattori, Daniels & Adrian, LLP

(57) ABSTRACT

A nonaqueous electrolyte of nonaqueous secondary battery contains a nitrile group-containing compound at a concentration of 0.05% by mass or more. A positive electrode active material has an average particle diameter of 4.5 to 15.5 μm and a specific surface area of 0.13 to 0.80 m$^2$/g. A positive electrode binder layer contains a silane coupling agent and/or at least one of aluminum, titanium, or zirconium based coupling agent having an alkyl or an alkoxy groups having 1 to 18 carbon atoms at a content of 0.003% by mass or more and 5% by mass or less. Thus nonaqueous secondary battery having a film resistance of the interface between a positive electrode and the electrolyte being less increased, and excellent ion conductivity and charge load characteristics in a low temperature environment is provided.

15 Claims, No Drawings

NONAQUEOUS SECONDARY BATTERY WITH NITRILE GROUP-CONTAINING COMPOUND

TECHNICAL FIELD

The present invention relates to a nonaqueous secondary battery including a lithium composite oxide as a positive electrode active material. More particularly, the invention relates to a nonaqueous secondary battery in which, when used with a nonaqueous electrolyte containing a nitrile group-containing compound, film resistance of the interface between a positive electrode and the electrolyte is increased less, ion conductivity is good, the amount of gas generated is small when the battery is stored at high temperature in a charged state, capacity efficiency is good, and charge load characteristics are good in a low temperature environment.

BACKGROUND ART

Recently, as power supplies for driving portable electronic equipment, such as cell phones, portable personal computers, and portable music players, and further, as power supplies for hybrid electric vehicles (HEVs) and electric vehicles (EVs), nonaqueous secondary batteries represented by lithium ion secondary batteries having a high energy density and high capacity are widely used.

As for the positive electrode active material in these nonaqueous secondary batteries, one of or a mixture of a plurality of lithium transition-metal composite oxides represented by $LiMO_2$ (where M is at least one of Co, Ni, and Mn), (namely, $LiCoO_2$, $LiNiO_2$, $LiNi_yCo_{1-y}O_2$ (y=0.01 to 0.99), $LiMnO_2$, $LiMn_2O_4$, $LiCo_xMn_yNi_zO_2$ (x+y+z=1)), $LiFePO_4$, and the like, all of which can reversibly absorb and desorb lithium ions, is used.

Among them, lithium-cobalt composite oxides and other metallic element-containing lithium-cobalt composite oxides are primarily used because their battery characteristics in various aspects are especially higher than those of other oxides. However, cobalt is expensive, and the amount of cobalt is small in natural resources. Thus, in order to continue to use such lithium-cobalt composite oxides and other metallic element-containing lithium-cobalt composite oxides as the positive electrode active material of a nonaqueous secondary battery, the nonaqueous secondary battery is desired to have higher performance.

Meanwhile, when a nonaqueous secondary battery is stored in a charged state in a high temperature environment, the positive electrode is readily degraded. This is believed to be because a nonaqueous electrolyte is oxidatively decomposed on a positive electrode active material or transition-metal ions of the positive electrode active material are eluted when the nonaqueous secondary battery is stored in a charged state, and because the decomposition of a nonaqueous electrolyte and the elution of metal ions are accelerated in a high-temperature environment as compared in a normal temperature environment.

To address this issue, JP-A-2009-32653 discloses an example using a nonaqueous electrolyte containing a compound having 2 or more and 4 or less nitrile groups in the structure formula and at least one compound selected from the group consisting of a fluorinated cyclic carbonate having 2 or more fluorine atoms, a monofluorophosphate, and a difluorophosphate in order to suppress gas generation in a nonaqueous secondary battery when the battery is stored at high temperature in a charged state and to improve cycle characteristics. JP-A-2009-158464 discloses an example using a nonaqueous electrolyte containing a compound having 2 or more and 4 or less nitrile groups in the structure formula in a nonaqueous secondary battery using a negative electrode active material containing at least one of Si, Sn, and Pb in order to suppress gas generation when the battery is stored at high temperature in a charged state and to improve cycle characteristics.

JP-A-09-199112 discloses an example in which a positive electrode binder is mixed with an aluminum coupling agent in order to improve cycle characteristics when a nonaqueous secondary battery is charged and discharged at high voltage under a heavy load condition. Furthermore, JP-A-2002-319405 discloses an example in which a silane coupling agent having an organic reactive group such as an epoxy group and amino group and a bonding group such as a methoxy group and ethoxy group is dispersed in a positive electrode binder in order to improve wettability of a positive electrode with an electrolyte in a nonaqueous secondary battery at low temperature and to improve output characteristics at low temperature.

JP-A-2007-242303 discloses an example in which a positive electrode active material is treated with a silane coupling agent having a plurality of bonding groups in order to improve cycle characteristics when intermittent cycles of a nonaqueous secondary battery are repeated. JP-A-2007-280830 discloses an example in which a silane coupling agent is present near a broken surface of a positive electrode active material occurring when a positive electrode binder layer is compressed in order to improve cycle characteristics of a nonaqueous secondary battery.

By the inventions disclosed in JP-A-2009-32653 and JP-A-2009-158464, because a compound having 2 or more and 4 or less nitrile groups in the structure formula is adsorbed on a positive electrode in a charged state, it is considered that the compound has advantageous effects of protecting the surface of the positive electrode, reducing side reactions between a nonaqueous electrolyte and the positive electrode, and improving various types of battery characteristics when the battery is stored at high temperature.

It is believed that such effect is derived from the following mechanism. When a nitrile group-containing compound is contained in a nonaqueous electrolyte, the compound is coordinated with a trace amount of metal ions eluted from a positive electrode and deposited on the positive electrode surface, or a reaction product by oxidative decomposition is deposited on the positive electrode surface. Because such a film formed on the positive electrode surface works to prevent direct contact of the nonaqueous electrolyte or a separator with the positive electrode, the oxidative decomposition of the nonaqueous electrolyte or the separator is suppressed, and thus the gas generated when the battery is stored at high temperature in a charged state can be suppressed.

However, the film formed on the positive electrode surface has the following problems: because the film increases film resistance of the interface between the positive electrode and the nonaqueous electrolyte, ion conduction is inhibited; operating voltage is decreased, and capacity efficiency is decreased when the battery is stored in a charged state in a high temperature environment; and charge load characteristics are significantly decreased in a low temperature environment.

The inventions disclosed in JP-A-09-199112, JP-A-2002-319405, JP-A-2007-242303, and JP-A-2007-280830 show that mixing a silane or aluminum coupling agent in a positive electrode binder can possibly lead to an improvement in cycle characteristics and output characteristics in a low temperature environment to some extent. However, the inventions disclosed in JP-A-09-199112, JP-A-2002-319405, JP-A-2007-

242303, and JP-A-2007-280830 have problems that the amount of gas generated is large when a nonaqueous secondary battery is stored at high temperature in a charged state and capacity efficiency is decreased.

The inventors of the present invention have carried out various experiments repeatedly on such a nonaqueous secondary battery in which a nitrile group-containing compound is added to a nonaqueous electrolyte in order to improve the charge load characteristics in a low temperature environment and the capacity efficiency when stored at high temperature in a charged state. As a result, the inventors have found that the problems mentioned above can be solved when a positive electrode binder contains a predetermined amount of a silane or aluminum coupling agent and the average particle diameter and the specific surface area of a positive electrode active material are maintained in a predetermined range, whereby the invention has been accomplished.

SUMMARY

An advantage of some aspects of the invention is to provide a nonaqueous secondary battery including a lithium composite oxide as a positive electrode active material, in which the amount of gas generated is small when the battery is stored at high temperature in a charged state, capacity efficiency is good, and charge load characteristics are good in a low temperature environment.

According to an aspect of the invention, a nonaqueous secondary battery of the invention includes a positive electrode plate formed with a positive electrode binder layer having a lithium composite oxide as a positive electrode active material, a negative electrode plate, a separator, and a nonaqueous electrolyte. In the nonaqueous secondary battery, the nonaqueous electrolyte contains a nitrile group-containing compound at a concentration of 0.05% by mass or more with respect to the total mass of the nonaqueous electrolyte, the positive electrode active material has an average particle diameter of 4.5 to 15.5 μm and a specific surface area of 0.13 to 0.80 m²/g, and the positive electrode binder layer contains at least one of a silane coupling agent and a coupling agent represented by General Formula (I) at a content of 0.003% by mass or more and 5% by mass or less with respect to the mass of the positive electrode active material:

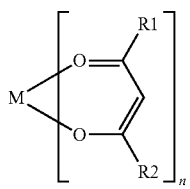

(I)

(where M is one atom selected from Al, Ti, and Zr, each of R1 and R2 is an alkyl group or an alkoxy group having 1 to 18 carbon atoms, and n represents an integer of 1 to 4).

In the nonaqueous secondary battery of the invention, when the nonaqueous electrolyte contains a nitrile group-containing compound at a concentration of 0.05% by mass or more with respect to the total mass of the nonaqueous electrolyte, the oxidative decomposition of the nonaqueous electrolyte or the separator is suppressed, and thus the gas generated when the battery is stored at high temperature in a charged state can be suppressed. When the content of the nitrile group-containing compound in the nonaqueous electrolyte is less than 0.05% by mass with respect to the total mass of the nonaqueous electrolyte, the addition effect of the nitrile group-containing compound cannot be obtained. The larger the amount of the nitrile group-containing compound is added, the larger the suppression effect of the gas generated when the battery is stored at high temperature in a charged state. However, low temperature charging characteristics and capacity efficiency when the battery is stored at high temperature in a charged state start to decline when the amount added is excessively large, and thus it is desirable that the amount added does not exceed 7.00% by mass.

In the nonaqueous secondary battery of the invention, the positive electrode active material is required to have an average particle diameter of 4.5 to 15.5 μm and a specific surface area of 0.13 to 0.80 m²/g. When the positive electrode active material has an average particle diameter of less than 4.5 μm, even when the specific surface area is within a range of 0.13 to 0.80 m²/g, the low temperature charging characteristics, the cycle characteristic specific capacity, the operating voltage, and the capacity efficiency when the battery is stored at high temperature in a charged state are decreased, and moreover the amount of gas generated when stored at high temperature in a charged state is increased. When the positive electrode active material has an average particle diameter of more than 15.5 μm, even when the specific surface area is within a range of 0.13 to 0.80 m²/g, the low temperature charging characteristics, the cycle characteristic specific capacity, the operating voltage, and the capacity efficiency when the battery is stored at high temperature in a charged state start to further decline in comparison with those of a positive electrode active material having an average particle diameter of 15.5 μm or less.

In the nonaqueous secondary battery of the invention, when the positive electrode active material has a specific surface area of less than 0.13 m²/g, even when the positive electrode active material has an average particle diameter of 4.5 to 15.5 μm, the low temperature charging characteristics, the cycle characteristic specific capacity, the operating voltage, and the capacity efficiency when the battery is stored at high temperature in a charged state are decreased. When the positive electrode active material has a specific surface area of more than 0.80 m²/g, even when the positive electrode active material has an average particle diameter of 4.5 to 15.5 μm, the cycle characteristic specific capacity, the operating voltage, and the capacity efficiency when the battery is stored at high temperature in a charged state are decreased, and moreover the amount of gas generated when stored at high temperature in a charged state is increased.

In the nonaqueous secondary battery of the invention, the positive electrode binder layer is required to contain a coupling agent including at least one of a silane coupling agent and a coupling agent represented by General Formula (I):

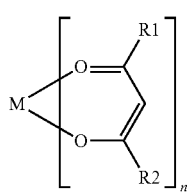

(I)

(where M is one atom selected from Al, Ti, and Zr, each of R1 and R2 is an alkyl group or an alkoxy group having 1 to 18 carbon atoms, and n represents an integer of 1 to 4).

When the positive electrode binder layer does not contain such a coupling agent or contains other coupling agents, even when the content of the nitrile group-containing compound in a nonaqueous electrolyte and the average particle diameter and the specific surface area of the positive electrode active material are within a predetermined range, the low temperature charging characteristics, the cycle characteristic specific capacity, the operating voltage, and the capacity efficiency when the nonaqueous secondary battery is stored at high temperature in a charged state are decreased, and moreover, the amount of gas generated when stored at high temperature in a charged state is increased.

In the nonaqueous secondary battery of the invention, the positive electrode binder layer is required to contain a coupling agent including at least one of a silane coupling agent and a coupling agent represented by General Formula (I) at a content of 0.003% by mass or more and 5% by mass or less with respect to the mass of the positive electrode active material. When the content of such a coupling agent is less than 0.003% by mass with respect to the mass of the positive electrode active material, the content is too low to provide the addition effect of the coupling agent. When the content of such a coupling agent is more than 5% by mass with respect to the mass of the positive electrode active material, positive electrode resistance becomes large to reduce initial capacity.

Preferred examples of the positive electrode active material used in the nonaqueous secondary battery of the invention include lithium composite oxides such as $LiCoO_2$, $LiNiO_2$, $LiMn_2O_4$, $LiMnO_2$, $LiNi_{1-x}Mn_xO_2$ (0<x<1), $LiNi_{1-x}Co_xO_2$ (0<x<1), and $LiNi_xMn_yCo_zO_2$ (0<x, y, z<1, x+y+z=1), and phosphoric acid compounds having an olivine structure such as $LiFePO_4$.

A coupling agent may be contained in the positive electrode binder layer in the nonaqueous secondary battery of the invention by direct coating on the positive electrode plate or mixing in a positive electrode binder slurry. The coupling agent is not specifically limited and may be diluted in any solvent for use. Suitable examples of the solvent include organic solvents including ketones such as acetone and methyl ethyl ketone (MEK), ethers such as tetrahydrofuran (THF), alcohols such as ethanol and isopropanol, and N-methyl-2-pyrrolidone (NMP) and a silicone oil.

Examples of the negative electrode active material usable in the nonaqueous secondary battery of the invention include carbon materials such as graphite, non-graphitizable carbon, and graphitizable carbon; titanium oxides such as $LiTiO_2$ and $TiO_2$; metalloid elements such as silicon and tin; and an Sn—Co alloy.

Examples of the nonaqueous solvent usable in the nonaqueous secondary battery of the invention include cyclic carbonates such as ethylene carbonate (EC), propylene carbonate (PC), and butylene carbonate (BC); fluorinated cyclic carbonates; cyclic carboxylic acid esters such as γ-butyrolactone (BL) and γ-valerolactone (VL); chain carbonates such as dimethyl carbonate (DMC), ethyl methyl carbonate (EMC), diethyl carbonate (DEC), methyl propyl carbonate (MPC), and dibutyl carbonate (DNBC); chain carboxylic acid esters such as methyl pivalate, ethyl pivalate, methyl isobutyrate, and methyl propionate; amide compounds such as N,N'-dimethylformamide and N-methyloxazolidinone; sulfur compounds such as sulfolane; and ambient temperature molten salts such as 1-ethyl-3-methylimidazolium tetrafluoroborate. It is best for these solvents to be used in mixtures of two or more. Among them, EC, PC, chain carbonates, and tertiary-carboxylic acid esters in particular are preferred.

As the separator used in the nonaqueous secondary battery of the invention, microporous membrane separators formed from polyolefin materials such as polypropylene and polyethylene may be selected. The separator may be mixed with a resin having a low melting point in order to ensure shutdown response of the separator, or may be laminated with a high-melting resin or be a resin supported with inorganic particles in order to obtain heat resistance.

The nonaqueous electrolyte used in the nonaqueous secondary battery of the invention may further include, as a compound for stabilizing electrodes, vinylene carbonate (VC), vinyl ethyl carbonate (VEC), succinic anhydride (SuAH), maleic anhydride (MaAH), glycolic acid anhydride, ethylene sulfite (ES), divinyl sulfone (VS), vinyl acetate (VA), vinyl pivalate (VP), catechol carbonate, biphenyl (BP), and the like. These compounds may be properly used in mixtures of two or more.

As the electrolyte salt dissolved in the nonaqueous solvent used in the nonaqueous secondary battery of the invention, lithium salts that are commonly used as the electrolyte salt in a nonaqueous secondary battery may be used. Examples of such lithium salt include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures of them. Among them, $LiPF_6$ (lithium hexafluorophosphate) in particular is preferred. The dissolution amount of an electrolyte salt is preferably 0.5 to 2.0 mol/L in the nonaqueous solvent.

As the silane coupling agent capable of being employed in the nonaqueous secondary battery of the invention, a silane coupling agent having at least one organic functional group and a plurality of bonding groups in the molecule may be used. The organic functional group may be any groups having various hydrocarbon skeletons. Examples of the organic functional group include an alkyl group, a mercaptopropyl group, and a trifluoropropyl group. Examples of the bonding group include a hydrolyzable alkoxy group.

In the coupling agent having the structure of General Formula (I), M may be one atom selected from Al, Ti, and Zr, but Al in particular is preferred. When M is Al, the coupling agent can be synthesized at low cost, and better results can be obtained than when M is Ti or Zr.

In the coupling agent having the structure of General Formula (I), when at least one of R1 and R2 is an alkoxy group (such as an ethoxy group, an iso-propoxy group, and a tert-butoxy group), the coupling agent has a large effect on improving characteristics. It is preferable that an alkoxy group (such as an iso-propoxy group and a tert-butoxy group) be bonded to atom M in General Formula (I), because the reactivity to a positive electrode active material is improved. The number of alkoxy groups bonded to atom M is preferably two or less in order to improve hydrolysis resistance of the compound.

Examples of the nitrile group-containing compound used in the nonaqueous secondary battery of the invention include acetonitrile, propionitrile, butyronitrile, valeronitrile, hexanenitrile, octanenitrile, undecanenitrile, cyclohexanecarbonitrile, benzonitrile, succinonitrile, glutaronitrile, 2-methylglutaronitrile, adiponitrile, pimelonitrile, suberonitrile, azelanitrile, sebaconitrile, undecanedinitrile, dodecanedinitrile, 1,2,3-propanetricarbonitrile, 1,2,3-tris(2-cyanoethoxy)propane, 1,3,5-cyclohexanetricarbonitrile, 1,3,5-pentanetricarbonitrile, tert-butylmalononitrile, malononitrile, 3,3'-oxydipropionitrile, 3,3'-thiodipropionitrile, 1,2-dicyanobenzene, 1,3-dicyanobenzene, and 1,4-dicyanobenzene. In particular, dinitrile compounds represented by General Formula (II), such as adiponitrile, pimelonitrile, succinonitrile, and glutaronitrile, are preferable:

NC—R—CN　　(II)

(where R is an alkyl chain having 2 to 8 carbon atoms).

DESCRIPTION OF EXEMPLARY EMBODIMENTS

Exemplary embodiments of the invention will now be described in detail with reference to examples and comparative examples. It should be noted that the examples described below are illustrative examples of nonaqueous secondary batteries for embodying the technical spirit of the invention and are not intended to limit the invention to these examples, and the invention may be equally applied to various modifications without departing from the technical spirit described in the claims.

First, a specific method for producing a nonaqueous secondary battery common to various examples and comparative examples will be described.

Preparation of Positive Electrode

A positive electrode binder was prepared by mixing 95% by mass of various positive electrode active materials, 2.5% by mass of amorphous carbon HS-100 (trade name) as a conductive material, and 2.5% by mass of polyvinylidene fluoride (PVdF). To the binder, 50% by mass of N-methylpyrrolidone (NMP) with respect to the mass of the positive electrode binder was added to prepare a slurry. To the obtained slurry, a predetermined amount of various coupling agents was added. The whole was thoroughly stirred and then coated on both sides of an aluminum foil sheet having a thickness of 12 μm using the doctor blade method (coating amount: 400 g/m$^2$). Then, the coated foil was heated and dried (70 to 140° C.) and then formed under pressure so as to have a packing density of 3.70 g/cc (for $LiMn_2O_4$, 3.12 g/cc for $LiMn_{1/3}Ni_{1/3}Co_{1/3}O_2$)). Then, the foil was cut into a predetermined size to provide a positive electrode plate.

Preparation of Negative Electrode

A mixture was prepared by mixing 97% by mass of artificial graphite (d=0.335 nm), 2% by mass of carboxymethyl cellulose (CMC) as a thickener, and 1% by mass of styrene-butadiene rubber (SBR) as a binder. To the mixture, water was added to make a slurry. The slurry was coated on both sides of a copper foil sheet having a thickness of 8 μm (coating amount: 210 g/m$^2$). Then, the coated foil was dried, compressed with a compression roller, and cut into a predetermined size to prepare a negative electrode plate.

Preparation of Battery Before Pouring

A current collecting tab was welded to both the positive electrode plate and the negative electrode plate, each having a predetermined size. The electrode plates were wound with a polyethylene microporous membrane separator having a thickness of 16 μm interposed therebetween to prepare a wound electrode assembly. The obtained wound electrode assembly was stored in a laminated outer body that was formed into a cup shape. The outer body was sealed with heat except for a pouring hole to prepare a battery before pouring.

Preparation of Battery

A nonaqueous solvent was prepared by mixing 25% by volume of EC, 5% by volume of PC, 10% by volume of EMC, and 60% by volume of methyl pivalate. $LiPF_6$ as an electrolyte salt was dissolved in the nonaqueous solvent to prepare a nonaqueous electrolyte having a $LiPF_6$ concentration of 1M. 19 ml of the nonaqueous electrolyte was poured through the pouring hole, and thereafter vacuum impregnation treatment was performed. The pouring hole was then sealed with heat, and charging and discharging were performed to complete a nonaqueous secondary battery having a design capacity of 3600 mAh (1 It=3600 mA).

Measurement of Battery Characteristics

On each battery of Examples and Comparative Examples prepared as above, initial capacity, low temperature charging characteristics, cycle characteristic specific capacity, operating voltage, high-temperature charge conservation characteristics were determined by the following measurement methods.

Measurement of Initial Capacity

Each battery of Examples and Comparative Examples was charged in a constant temperature bath at 23° C. at a constant current of 0.5 It=1800 mA until the battery voltage reached 4.2 V. After the battery voltage reached 4.2 V, each battery was charged at a constant voltage of 4.2 V until the current value reached (1/50) It=180 mA. The charging capacity at this time was determined as a normal-temperature charging capacity. Then, the battery was discharged at a constant current of 0.5 It=1800 mA until the battery voltage reached 2.75 V. The discharging capacity at this time was determined as an initial capacity.

Measurement of Low Temperature Charging Characteristics

Each battery of Examples and Comparative Examples on which the initial capacity had been measured as described above was charged in a constant temperature bath at −5° C. at a constant current of 1 It=3600 mA until the battery voltage reached 4.2 V, and after the battery voltage reached 4.2 V, charged at a constant voltage of 4.2 V until the current value reached (1/50) It=180 mA. The charging capacity at this time was determined as a low-temperature charging capacity. Then, the low temperature charging characteristic (%) was calculated by the following calculation formula.

Low temperature charging characteristic (%)=(low-temperature charging capacity/normal-temperature charging capacity)×100

Measurement of Cycle Characteristic Specific Capacity

Each battery of Examples and Comparative Examples was charged in a constant temperature bath at 23° C. at a constant current of 1 It=3600 mA until the battery voltage reached 4.2 V. After the battery voltage reached 4.2 V, each battery was charged at a constant voltage of 4.2 V until the current value reached (1/50) It=180 mA. The battery was then discharged at a constant current of 1 It=3600 mA until the battery voltage reached 2.75 V. The discharging capacity at this time was determined as a discharging capacity at the first cycle. This charging and discharging cycle was repeated 800 times. The discharging capacity at the 800th cycle was determined as a discharging capacity at the 800th cycle, and the cycle characteristic (%) was calculated based on the following calculation formula.

Cycle characteristic (%)=(discharging capacity at the 800th cycle/discharging capacity at the first cycle)×100

Measurement of Operating Voltage

The operating voltage was determined as an average voltage when the discharging capacity at the first cycle was measured.

High-Temperature Charge Conservation Characteristics

The high-temperature charge conservation characteristics were measured as follows. Each battery of Examples and Comparative Examples was charged in a constant temperature bath at 23° C. at a constant current of 1 It=3600 mA until the battery voltage reached 4.2 V, and after the battery voltage reached 4.2 V, charged at a constant voltage of 4.2 V until the current value reached (1/50) It=180 mA. Then, the battery was discharged at a constant current of 1 It=3600 mA until the battery voltage reached 2.75 V. The discharging capacity at this time was determined as a discharging capacity before high temperature storage. Then, each battery of Examples and Comparative Examples was charged in a constant temperature bath at 23° C. at a constant current of 1 It=3600 mA until the battery voltage reached 4.2 V, and after the battery voltage reached 4.2 V, charged at a constant voltage of 4.2 V until the current value reached (1/50) It=180 mA. The full charged battery was left in a constant temperature bath at 80° C. for 10 days.

Then, each battery of Examples and Comparative Examples was left in a constant temperature bath at 23° C. to be cooled. Some of the battery outer bodies after storage were unsealed and the amount of generated gas was measured with a syringe. Next, the battery was discharged at a constant current of 1 It=3600 mA until the battery voltage reached 2.75 V.

Furthermore, each battery of Examples and Comparative Examples that had been discharged during high temperature storage was charged in a constant temperature bath at 23° C. at a constant current of 1 It=3600 mA until the battery voltage reached 4.2 V, and after the battery voltage reached 4.2 V, charged at a constant voltage of 4.2 V until the current value reached (1/50) It=180 mA. Then, the battery was discharged at a constant current of 1 It=3600 mA until the battery voltage reached 2.75 V. The discharging capacity at this time was determined as a discharging capacity after high temperature storage. Then, the capacity efficiency (%) was calculated based on the following calculation formula.

Capacity efficiency (%)=(discharging capacity after high temperature storage/discharging capacity before high temperature storage)×100

Examples 1 to 18, Comparative Examples 1 to 10

$LiCoO_2$ having an average particle diameter of 13.1 μm and a specific surface area of 0.25 $m^2/g$ was used as a positive electrode active material in each nonaqueous secondary battery of Examples 1 to 18 and Comparative Examples 1 to 10.

In Comparative Example 1, the nonaqueous electrolyte contained no nitrile group-containing compound, and no coupling agent was added to the positive electrode binder layer. In Comparative Examples 2 to 7, adiponitrile (NC—$(CH_2)_4$—CN) as a nitrile group-containing compound with a varied concentration of 0.03 to 2.00% by mass was added to the nonaqueous electrolyte, while no coupling agent was added to the positive electrode binder layer.

In Comparative Examples 8 and 9, no nitrile group-containing compound was added to the nonaqueous electrolyte, and aluminum bisethylacetoacetate monoacetylacetonate (Comparative Example 8) or methyltriethoxysilane (Comparative Example 9) was added as a coupling agent to the positive electrode binder layer. In Comparative Example 11, 0.03% by mass of adiponitrile was added as a nitrile group-containing compound to the nonaqueous electrolyte, and 0.20% by mass of aluminum bisethylacetoacetate monoacetylacetonate was added as a coupling agent to the positive electrode binder layer.

In each of Examples 1 to 12, 0.20% by mass of aluminum bisethylacetoacetate monoacetylacetonate was added as a coupling agent to the positive electrode binder layer, and 1.00% by mass of various nitrile group-containing compounds was added to the nonaqueous electrolyte. The names of various nitrile compounds used in Examples 1 to 12 are listed in Table 1.

In each of Examples 13 to 18, 0.20% by mass of aluminum bisethylacetoacetate monoacetylacetonate was added as a coupling agent to the positive electrode binder layer, and adiponitrile as a nitrile group-containing compound with a varied concentration of 0.05 to 7.00% by mass was added to the nonaqueous electrolyte. The measurement results of Examples 1 to 18 and Comparative Examples 1 to 10 are listed in Table 1.

TABLE 1

| | Nitrile group-containing compound | | Coupling agent | | Initial capacity (mAh) | Low temperature charging characteristics (%) | Cycle characteristic specific capacity (%) | Operating voltage (V) | High-temperature charge conservation characteristics* | |
|---|---|---|---|---|---|---|---|---|---|---|
| | Name | Amount added (% by mass) | Name | Amount added (% by mass) | | | | | Amount of generated gas (ml) | Capacity efficiency (%) |
| Comparative Example 1 | None | 0 | None | 0 | 3606 | 89 | 77 | 3.55 | 13.3 | 44 |
| Comparative Example 2 | Adiponitrile | 0.03 | None | 0 | 3603 | 86 | 77 | 3.64 | 13.2 | 45 |
| Comparative Example 3 | Adiponitrile | 0.05 | None | 0 | 3600 | 80 | 74 | 3.58 | 12.2 | 51 |
| Comparative Example 4 | Adiponitrile | 0.10 | None | 0 | 3601 | 72 | 70 | 3.56 | 11.2 | 53 |
| Comparative Example 5 | Adiponitrile | 0.50 | None | 0 | 3600 | 53 | 58 | 3.52 | 8.3 | 54 |
| Comparative Example 6 | Adiponitrile | 1.00 | None | 0 | 3600 | 43 | 52 | 3.49 | 6.2 | 56 |
| Comparative Example 7 | Adiponitrile | 2.00 | None | 0 | 3606 | 36 | 44 | 3.47 | 5.5 | 51 |
| Comparative Example 8 | None | 0 | Aluminum bisethylacetoacetate monoacetylacetonate | 0.20 | 3605 | 88 | 75 | 3.65 | 13.1 | 45 |
| Comparative Example 9 | None | 0 | Methyltriethoxysilane | 1.00 | 3600 | 84 | 71 | 3.65 | 13.0 | 45 |
| Example 1 | Propiononitrile | 1.00 | Aluminum bisethylacetoacetate monoacetylacetonate | 0.20 | 3603 | 90 | 78 | 3.66 | 4.8 | 79 |
| Example 2 | Malononitrile | 1.00 | Aluminum bisethylacetoacetate monoacetylacetonate | 0.20 | 3603 | 90 | 85 | 3.67 | 4.8 | 82 |

TABLE 1-continued

| | Nitrile group-containing compound | | Coupling agent | | Initial capacity (mAh) | Low temperature charging characteristics (%) | Cycle characteristic specific capacity (%) | Operating voltage (V) | High-temperature charge conservation characteristics* | |
|---|---|---|---|---|---|---|---|---|---|---|
| | Name | Amount added (% by mass) | Name | Amount added (% by mass) | | | | | Amount of generated gas (ml) | Capacity efficiency (%) |
| Example 3 | Succinonitrile | 1.00 | Aluminum bisethylacetoacetate monoacetylacetonate | 0.20 | 3604 | 93 | 87 | 3.67 | 4.9 | 87 |
| Example 4 | Glutaronitrile | 1.00 | Aluminum bisethylacetoacetate monoacetylacetonate | 0.20 | 3600 | 92 | 85 | 3.67 | 4.6 | 91 |
| Example 5 | 2-methylglutaronitrile | 1.00 | Aluminum bisethylacetoacetate monoacetylacetonate | 0.20 | 3606 | 90 | 82 | 3.67 | 4.3 | 92 |
| Example 6 | Adiponitrile | 1.00 | Aluminum bisethylacetoacetate monoacetylacetonate | 0.20 | 3601 | 92 | 86 | 3.67 | 4.2 | 92 |
| Example 7 | Pimelonitrile | 1.00 | Aluminum bisethylacetoacetate monoacetylacetonate | 0.20 | 3605 | 92 | 86 | 3.67 | 4.5 | 91 |
| Example 8 | Suberonitrile | 1.00 | Aluminum bisethylacetoacetate monoacetylacetonate | 0.20 | 3604 | 91 | 85 | 3.67 | 4.6 | 91 |
| Example 9 | Sebaconitrile | 1.00 | Aluminum bisethylacetoacetate monoacetylacetonate | 0.20 | 3605 | 91 | 85 | 3.67 | 4.8 | 91 |
| Example 10 | Undecanedinitrile | 1.00 | Aluminum bisethylacetoacetate monoacetylacetonate | 0.20 | 3601 | 90 | 83 | 3.66 | 4.9 | 82 |
| Example 11 | 3,3'-oxydipropionitrile | 1.00 | Aluminum bisethylacetoacetate monoacetylacetonate | 0.20 | 3603 | 90 | 82 | 3.65 | 5.3 | 74 |
| Example 12 | Benzonitrile | 1.00 | Aluminum bisethylacetoacetate monoacetylacetonate | 0.20 | 3605 | 90 | 78 | 3.65 | 5.3 | 72 |
| Comparative Example 10 | Adiponitrile | 0.03 | Aluminum bisethylacetoacetate monoacetylacetonate | 0.20 | 3602 | 87 | 80 | 3.65 | 13.4 | 43 |
| Example 13 | Adiponitrile | 0.05 | Aluminum bisethylacetoacetate monoacetylacetonate | 0.20 | 3603 | 91 | 81 | 3.65 | 5.4 | 75 |
| Example 14 | Adiponitrile | 0.10 | Aluminum bisethylacetoacetate monoacetylacetonate | 0.20 | 3604 | 92 | 83 | 3.66 | 4.9 | 87 |
| Example 15 | Adiponitrile | 0.50 | Aluminum bisethylacetoacetate monoacetylacetonate | 0.20 | 3605 | 92 | 85 | 3.67 | 4.4 | 90 |
| Example 16 | Adiponitrile | 2.00 | Aluminum bisethylacetoacetate monoacetylacetonate | 0.20 | 3602 | 92 | 85 | 3.67 | 4.3 | 91 |
| Example 17 | Adiponitrile | 5.00 | Aluminum bisethylacetoacetate monoacetylacetonate | 0.20 | 3603 | 91 | 85 | 3.65 | 4.0 | 91 |
| Example 18 | Adiponitrile | 7.00 | Aluminum bisethylacetoacetate monoacetylacetonate | 0.20 | 3602 | 88 | 84 | 3.64 | 4.0 | 94 |

*80° C., 10 days

The following facts were found based on the results listed in Table 1. The results of Comparative Examples 1 to 7, in which no coupling agent was added to each positive electrode binder layer, show that, the amount of gas generated after storage at high temperature in a charged state decreased as the amount of a nitrile group-containing compound added into the nonaqueous electrolyte increase, but in association with this, the low temperature charging characteristics and the cycle characteristic specific capacity significantly decreased and the operating voltage gradually decreased. However, both the initial capacity and the capacity efficiency after storage at high temperature in a charged state were not largely changed depending on the amount of the nitrile group-containing compound in the nonaqueous electrolyte, but the capacity efficiency after storage at high temperature in a charged state was significantly decreased in comparison with the batteries of Examples 1 to 18.

In the measurement results of Comparative Examples 8 and 9, in which each nonaqueous electrolyte was added with no nitrile group-containing compound, the initial capacity, the operating voltage, the amount of generated gas, the amount of gas generated after storage at high temperature in a charged state, and the storage characteristics was almost the same result as that from the battery of Comparative Example 1, in which no coupling agent was added, but each of the low temperature charge storage characteristics and the cycle characteristics were slightly decreased in comparison with the battery of Comparative Example 1, in which no coupling agent was added.

In contrast, in the case where 0.20% by mass of aluminum bisethylacetoacetate monoacetylacetonate was added as a coupling agent to the positive electrode binder layer, when 1.00% by mass of various nitrile group-containing compounds was added to the nonaqueous electrolyte (Examples 1 to 12), the initial capacity was almost the same as that of Comparative Examples 1 to 9, the low temperature charging characteristics, the cycle characteristic specific capacity, and the operating voltage were almost the same as or slightly better than those of Comparative Example 1 that had the best result among Comparative Examples 1 to 9. Moreover, the amount of generated gas after storage at high temperature in a charged state was better than that of Comparative Examples 1 to 9, and the capacity efficiency after storage at high temperature in a charged state was significantly better than that of Comparative Examples 1 to 9.

Based on the results of Comparative Example 10 and Examples 13 to 18, it is clear that, in the case where 0.20% by mass of aluminum bisethylacetoacetate monoacetylacetonate was added as a coupling agent to the positive electrode binder layer, when the amount of the nitrile group-containing compound added into the nonaqueous electrolyte was less than 0.05% by mass with respect to the total mass of the nonaqueous electrolyte, the amount of gas generated after storage at high temperature in a charged state was increased and the addition effect of the nitrile group-containing compound was not obtained. Therefore, the amount of a nitrile group-containing compound added into the nonaqueous electrolyte is preferably 0.05% by mass or more.

Based on the results of Comparative Example 10 and Examples 13 to 18, it is preferable that the amount of a nitrile group-containing compound added into the nonaqueous electrolyte do not exceed 7.00% by mass because the effect of suppressing the gas generated when the battery is stored at high temperature in a charged state increases as the amount added increases, but the low temperature charging characteristics and the capacity efficiency when stored at high temperature in a charged state start to decline when the amount is excessively large.

Examples 19 to 36, Comparative Examples 11 and 12

In each nonaqueous secondary battery of Examples 19 to 36 and Comparative Examples 11 and 12, $LiCoO_2$ having an average particle diameter of 13.1 μm and a specific surface area of 0.25 $m^2/g$ was used as a positive electrode active material, and adiponitrile was added as a nitrile group-containing compound to the nonaqueous electrolyte to have an adiponitrile concentration of 1.0% by mass.

In Comparative Example 11, ferric trisacetylacetonate was used as a coupling agent. In Examples 19 to 24, various compounds represented by General Formula (I) were used as a coupling agent, and in Examples 25 to 29, various silane coupling agents were used. Each of the coupling agents used in Examples 19 to 24 was a compound having an alkoxy group except for aluminum trisacetylacetonate used in Example 21 and zirconium tetrakisacetylacetonate used in Example 24. The names of the various coupling agents used in Examples 19 to 29 are listed in Table 2.

(I)

(where M is one atom selected from Al, Ti, and Zr, each of R1 and R2 is an alkyl group or an alkoxy group having 1 to 18 carbon atoms, and n represents an integer of 1 to 4.)

In Examples 30 to 36 and Comparative Example 12, aluminum bisethylacetoacetate monoacetylacetonate was used as a coupling agent with a varied concentration of 0.003 to 5.00% by mass (Examples 30 to 36) or with a concentration of 7.00% by mass (Comparative Example 12). The results of Examples 19 to 36 and Comparative Examples 11 and 12 are listed in Table 2 together with the results of Example 6 and Comparative Example 6.

TABLE 2

| | Coupling agent | | | | Cycle | | High-temperature charge conservation characteristics* | |
|---|---|---|---|---|---|---|---|---|
| | Name | Amount added (% by weight) | Initial capacity (mAh) | Low temperature charging characteristics (%) | characteristic specific capacity (%) | Operating voltage (V) | Amount of generated gas (ml) | Capacity efficiency (%) |
| Comparative Example 6 | None | 0 | 3600 | 43 | 52 | 3.49 | 6.2 | 56 |
| Example 19 | Aluminum ethylacetoacetate diisopropylate | 0.20 | 3603 | 91 | 85 | 3.66 | 4.4 | 89 |
| Example 20 | Aluminum trisethylacetoacetate | 0.20 | 3604 | 92 | 86 | 3.67 | 4.3 | 91 |
| Example 6 | Aluminum bisethylacetoacetate monoacetylacetonate | 0.20 | 3601 | 92 | 86 | 3.67 | 4.2 | 92 |
| Example 21 | Aluminum trisacetylacetonate | 0.20 | 3602 | 90 | 83 | 3.65 | 4.9 | 86 |
| Example 22 | Titanium bis(ethylacetoacetate)diisopropoxide | 0.20 | 3602 | 89 | 81 | 3.64 | 5.4 | 82 |
| Example 23 | Titanium bisethylacetoacetate bisacetylacetonate | 0.20 | 3607 | 89 | 81 | 3.64 | 5.6 | 79 |

TABLE 2-continued

| | Coupling agent | | Initial capacity (mAh) | Cycle | | | High-temperature charge conservation characteristics* | |
|---|---|---|---|---|---|---|---|---|
| | Name | Amount added (% by weight) | | Low temperature charging characteristics (%) | characteristic specific capacity (%) | Operating voltage (V) | Amount of generated gas (ml) | Capacity efficiency (%) |
| Example 24 | Zirconium tetrakisacetylacetonate | 0.20 | 3603 | 90 | 79 | 3.65 | 5.8 | 73 |
| Comparative Example 11 | Ferric trisacetylacetonate | 0.20 | 3589 | 45 | 47 | 3.46 | 6.5 | 52 |
| Example 25 | Methyltrimethoxysilane | 1.00 | 3604 | 76 | 79 | 3.63 | 5.7 | 77 |
| Example 26 | Dimethyldimethoxysilane | 1.00 | 3605 | 77 | 78 | 3.63 | 5.6 | 76 |
| Example 27 | Methyltriethoxysilane | 1.00 | 3603 | 73 | 78 | 3.64 | 5.1 | 79 |
| Example 28 | Hexyltrimethoxysilane | 1.00 | 3609 | 81 | 77 | 3.63 | 5.2 | 79 |
| Example 29 | 3-acryloxypropyltrimethoxysilane | 1.00 | 3604 | 75 | 79 | 3.64 | 4.9 | 81 |
| Example 30 | Aluminum bisethylacetoacetate monoacetylacetonate | 0.003 | 3606 | 71 | 75 | 3.61 | 6.2 | 63 |
| Example 31 | Aluminum bisethylacetoacetate monoacetylacetonate | 0.001 | 3601 | 91 | 83 | 3.65 | 5.1 | 83 |
| Example 32 | Aluminum bisethylacetoacetate monoacetylacetonate | 0.10 | 3604 | 92 | 86 | 3.67 | 4.3 | 91 |
| Example 33 | Aluminum bisethylacetoacetate monoacetylacetonate | 0.50 | 3605 | 92 | 85 | 3.66 | 4.3 | 90 |
| Example 34 | Aluminum bisethylacetoacetate monoacetylacetonate | 1.00 | 3604 | 91 | 85 | 3.66 | 4.3 | 88 |
| Example 35 | Aluminum bisethylacetoacetate monoacetylacetonate | 2.00 | 3601 | 88 | 80 | 3.64 | 4.3 | 74 |
| Example 36 | Aluminum bisethylacetoacetate monoacetylacetonate | 5.00 | 3604 | 76 | 73 | 3.63 | 4.2 | 67 |
| Comparative Example 12 | Aluminum bisethylacetoacetate monoacetylacetonate | 7.00 | 3586 | 62 | 64 | 3.61 | 4.3 | 64 |

*80° C., 10 days

The following facts were found based on the results listed in Table 2. When a nitrile group-containing compound was added to the nonaqueous electrolyte, the results of Examples 6 and 19 to 24, in which a compound represented by Chemical Formula (I) was used as a coupling agent, and the results of Examples 25 to 29, in which a silane coupling agent was used as a coupling agent, were significantly better than the result of Comparative Example 11, in which ferric trisacetylacetonate was used as a coupling agent. This reveals that a compound represented by Chemical Formula (I) or a silane coupling agent is preferred as a coupling agent.

Among Examples 6, 19 to 24, in which a compound represented by Chemical Formula (I) was used as a coupling agent, the results of Examples 6, 19 to 21, in which M was Al, are better in terms of the cycle characteristic specific capacity, the amount of generated gas after storage at high temperature in a charged state, and the capacity efficiency than the results of Examples 22 and 23, in which M was Ti, and the results of Example 24, in which M was Zr. This reveals that M is preferably Al when a compound represented by Chemical Formula (I) is used as a coupling agent.

In Examples 6, 19 to 21, in which M was Al, it is revealed that the results of 19, 20 and 6, in which R1 or R2 is an alkoxy group, show slightly better characteristics than those of Example 21, in which neither R1 nor R2 was an alkoxy group.

Based on the results of Examples 6, and 30 to 36 and Comparative Example 12, in which the amount of aluminum bisethylacetoacetate monoacetylacetonate as a coupling agent was varied from 0.003 to 7.00% by mass, when the added amount of the coupling agent was 0.003% by mass, sufficiently good result was obtained in comparison with the case without a coupling agent (Comparative Example 6). When the added amount of the coupling agent was increased to 7.00% by mass (Comparative Example 12), the initial capacity was largely decreased. This reveals that the added amount of a compound represented by Chemical Formula (I) or a silane coupling agent as a coupling agent is preferably 0.003% by mass or more and 5% by mass or less with respect to the mass of a positive electrode active material when a nitrile group-containing compound was added to the nonaqueous electrolyte.

Examples 37 to 50 and Comparative Examples 13 to 31

In each nonaqueous secondary battery of Examples 37 to 50 and Comparative Examples 13 to 31, adiponitrile was added as a nitrile group-containing compound to the nonaqueous electrolyte, and aluminum bisethylacetoacetate monoacetylacetonate was added to the positive electrode binder layer as a coupling agent.

In Examples 37 to 45 and Comparative Examples 13 to 26, $LiCoO_2$ having a varied average particle diameter of 3.3 to 16.4 μm and a varied specific surface area of 0.11 to 0.90 m$^2$/g was used as the positive electrode active material, and a nitrile group-containing compound and a coupling agent were or were not added. In Examples 46 to 50 and Comparative Examples 27 to 31, various positive electrode active materials other than $LiCoO_2$ were used, and a nitrile group-containing compound and a coupling agent were or were not added.

In Examples 37 to 50 and Comparative Examples 13 to 31, when a nitrile group-containing compound was added to the nonaqueous electrolyte, the nitrile group-containing compound was added so as to have a concentration of 1.00% by mass, and when a coupling agent was added, the coupling agent was added so as to have a concentration of 0.20% by mass. The measurement results of Examples 37 to 50 and Comparative Examples 13 to 31 are listed in Table 3 together with those of Example 6 and Comparative Examples 1 and 6.

TABLE 3

| | Positive electrode active material | Physical properties of positive electrode | | Adiponitrile (% by mass) | Added amount of coupling agent (% by mass) | Initial capacity (mAh) | Low temperature charging characteristics (%) | Cycle characteristic specific capacity (%) | Operating voltage (V) | High-temperature charge conservation characteristics* | |
|---|---|---|---|---|---|---|---|---|---|---|---|
| | | Average particle diameter (μm) | Specific surface area (m²/g) | | | | | | | Amount of generated gas (ml) | Capacity efficiency (%) |
| Comparative Example 13 | $LiCoO_2$ | 3.3 | 0.85 | 1.00 | 0.20 | 3610 | 88 | 67 | 3.61 | 34.9 | 18 |
| Comparative Example 14 | $LiCoO_2$ | 3.5 | 0.63 | None | None | 3600 | 88 | 73 | 3.62 | 30.1 | 21 |
| Comparative Example 15 | $LiCoO_2$ | 3.5 | 0.63 | 1.00 | None | 3604 | 45 | 45 | 3.47 | 27.3 | 23 |
| Comparative Example 16 | $LiCoO_2$ | 3.5 | 0.63 | 1.00 | 0.20 | 3605 | 46 | 43 | 3.46 | 28.4 | 24 |
| Example 37 | $LiCoO_2$ | 4.5 | 0.55 | 1.00 | 0.20 | 3603 | 89 | 84 | 3.66 | 6.2 | 66 |
| Example 38 | $LiCoO_2$ | 4.6 | 0.72 | 1.00 | 0.20 | 3607 | 90 | 82 | 3.66 | 6.0 | 67 |
| Comparative Example 17 | $LiCoO_2$ | 5.2 | 0.90 | None | None | 3606 | 90 | 70 | 3.64 | 36.8 | 14 |
| Comparative Example 18 | $LiCoO_2$ | 5.2 | 0.90 | 1.00 | None | 3606 | 51 | 56 | 3.49 | 35.5 | 14 |
| Comparative Example 19 | $LiCoO_2$ | 5.2 | 0.90 | 1.00 | 0.20 | 3602 | 51 | 54 | 3.50 | 36.0 | 13 |
| Example 39 | $LiCoO_2$ | 5.5 | 0.80 | 1.00 | 0.20 | 3605 | 90 | 80 | 3.63 | 6.3 | 73 |
| Example 40 | $LiCoO_2$ | 5.7 | 0.67 | 1.00 | 0.20 | 3605 | 90 | 81 | 3.65 | 5.6 | 82 |
| Example 41 | $LiCoO_2$ | 6.1 | 0.49 | 1.00 | 0.20 | 3601 | 91 | 82 | 3.65 | 5.7 | 81 |
| Example 42 | $LiCoO_2$ | 9.7 | 0.38 | 1.00 | 0.20 | 3604 | 91 | 85 | 3.66 | 5.3 | 86 |
| Comparative Example 20 | $LiCoO_2$ | 14.3 | 0.11 | None | None | 3603 | 64 | 72 | 3.61 | 8.9 | 45 |
| Comparative Example 21 | $LiCoO_2$ | 14.3 | 0.11 | 1.00 | None | 3604 | 23 | 50 | 3.43 | 3.9 | 21 |
| Comparative Example 22 | $LiCoO_2$ | 14.3 | 0.11 | 1.00 | 0.20 | 3605 | 25 | 54 | 3.46 | 4.0 | 25 |
| Comparative Example 1 | $LiCoO_2$ | 13.1 | 0.25 | None | None | 3606 | 89 | 77 | 3.65 | 13.3 | 44 |
| Comparative Example 6 | $LiCoO_2$ | 13.1 | 0.25 | 1.00 | None | 3600 | 43 | 52 | 3.49 | 6.2 | 56 |
| Example 6 | $LiCoO_2$ | 13.1 | 0.25 | 1.00 | 0.20 | 3601 | 92 | 86 | 3.67 | 4.2 | 92 |
| Example 43 | $LiCoO_2$ | 14.6 | 0.22 | 1.00 | 0.20 | 3602 | 92 | 85 | 3.67 | 4.0 | 91 |
| Example 44 | $LiCoO_2$ | 15.2 | 0.18 | 1.00 | 0.20 | 3604 | 88 | 79 | 3.67 | 3.9 | 79 |
| Example 45 | $LiCoO_2$ | 15.5 | 0.13 | 1.00 | 0.20 | 3606 | 87 | 78 | 3.66 | 4.0 | 77 |
| Comparative Example 23 | $LiCoO_2$ | 16.4 | 0.16 | None | None | 3600 | 81 | 69 | 3.62 | 12.8 | 48 |
| Comparative Example 24 | $LiCoO_2$ | 16.4 | 0.16 | 1.00 | None | 3603 | 43 | 62 | 3.52 | 6.5 | 53 |
| Comparative Example 25 | $LiCoO_2$ | 16.4 | 0.16 | 1.00 | 0.20 | 3602 | 62 | 63 | 3.56 | 5.9 | 56 |
| Comparative Example 26 | $LiCoO_2$ | 16.6 | 0.12 | 1.00 | 0.20 | 3604 | 80 | 65 | 3.62 | 5.8 | 52 |
| Comparative Example 27 | $Li_{1/3}Ni_{1/3}Co_{1/3}O_2$ | 10.3 | 0.49 | None | None | 3605 | 82 | 80 | 3.64 | 11.6 | 52 |
| Example 46 | $Li_{1/3}Ni_{1/3}Co_{1/3}O_2$ | 10.3 | 0.49 | 1.00 | 0.20 | 3602 | 86 | 82 | 3.66 | 5.5 | 84 |
| Comparative Example 28 | $LiMn_2O_2$ | 12.7 | 0.58 | None | None | 3607 | 90 | 81 | 3.66 | 22.4 | 31 |
| Example 47 | $LiMn_2O_2$ | 12.7 | 0.58 | 1.00 | 0.20 | 3609 | 91 | 85 | 3.66 | 4.1 | 90 |
| Comparative Example 29 | $LiNiO_2$ | 10.8 | 0.32 | None | None | 3608 | 84 | 73 | 3.62 | 29.8 | 21 |
| Example 48 | $LiNiO_2$ | 10.8 | 0.32 | 1.00 | 0.20 | 3609 | 90 | 81 | 3.63 | 6.8 | 82 |
| Comparative Example 30 | $Li_{0.85}Co_{0.15}O_2$ | 10.2 | 0.31 | None | None | 3605 | 86 | 77 | 3.62 | 21.5 | 49 |
| Example 49 | $Li_{0.85}Co_{0.15}O_2$ | 10.2 | 0.31 | 1.00 | 0.20 | 3604 | 91 | 85 | 3.63 | 5.7 | 90 |
| Comparative Example 31 | $LiCo_{0.99}Al_{0.01}O_2$ | 9.3 | 0.44 | None | None | 3606 | 87 | 83 | 3.65 | 10.6 | 56 |
| Example 50 | $LiCo_{0.99}Al_{0.01}O_2$ | 9.3 | 0.44 | 1.00 | 0.20 | 3603 | 92 | 87 | 3.66 | 5.9 | 90 |

Coupling agent: aluminum bisethylacetoacetate monoacetylacetonate.
*80° C., 10 days The following facts were found based on the results listed in Table 3. In Comparative Example 13, in which $LiCoO_2$ having an average particle diameter of 3.3 μm and a specific surface area of 0.85 m²/g was used as the positive electrode active material, even the nitrile group-containing compound and the coupling agent were added, the amount of gas generated after storage at high temperature in a charged state was very high and the capacity efficiency was extremely low. However, in Comparative Example 13, the initial capacity and the low temperature charging characteristics were good, and the cycle characteristic specific capacity and the operating voltage were slightly lower than those of Examples.

In Comparative Examples 14 to 16, in which $LiCoO_2$ having an average particle diameter of 3.5 μm and a specific surface area of 0.63 m²/g was used as the positive electrode active material, when only a nitrile group-containing compound was added (Comparative Example 15) and both a nitrile group-containing compound and a coupling agent were added (Comparative Example 16), each initial capacity and both of the amount of generated gas and the capacity efficiency when the battery was stored at high temperature in a charged state were slightly better but each of the low temperature charging characteristics, the cycle characteristics, and the operating voltage was largely decreased than those in the case where neither a nitrile group-containing compound nor a coupling agent was added (Comparative Example 14). Furthermore, in Comparative Examples 17 to 19, in which $LiCoO_2$ having an average particle diameter of 5.2 μm and a specific surface area of 0.90 m²/g was used as the positive electrode active material, when only a nitrile group-containing compound was added (Comparative Example 18), both a nitrile group-containing compound and a coupling agent were added (Comparative Example 19), and neither of them was added (Comparative Example 17), each amount of generated gas when the battery was stored at high temperature in a charged state was extremely high and each capacity efficiency was extremely decreased.

In Comparative Examples 20 to 22, in which $LiCoO_2$ having an average particle diameter of 14.3 μm and a specific surface area of 0.11 m²/g was used as the positive electrode active material, when only a nitrile group-containing compound was added (Comparative Example 21) and both a nitrile group-containing compound and a coupling agent were added (Comparative Example 22), each initial capacity and both the amount of generated gas and the capacity efficiency when the battery was stored at high temperature in a charged state were slightly better but each of the low temperature charging characteristics, the cycle characteristics, and the operating voltage was largely decreased than those in the case where neither a nitrile group-containing compound nor a coupling agent was added (Comparative Example 20). In Comparative Examples 21 and 22, the amount of generated gas when the battery was stored at high temperature in a charged state was very good.

In Comparative Examples 23 to 25, in which $LiCoO_2$ having an average particle diameter of 16.4 μm and a specific surface area of 0.16 m²/g was used as the positive electrode active material, when only a nitrile group-containing compound was added (Comparative Example 24) and both a nitrile group-containing compound and a coupling agent were added (Comparative Example 25), each initial capacity and both the amount of generated gas and the capacity efficiency when the battery was stored at high temperature in a charged state were slightly better but each of the low temperature charging characteristics, the cycle characteristics, and the operating voltage was largely decreased than those in the case where neither a nitrile group-containing compound nor a coupling agent was added (Comparative Example 23). In Comparative Examples 24 and 25, the amount of generated gas when the batter was stored at high temperature in a charged state was very good. Furthermore, when $LiCoO_2$ having an average particle diameter of 16.6 μm and a specific surface area of 0.12 m²/g was used as the positive electrode active material, and both a nitrile group-containing compound and a coupling agent were added (Comparative Example 26), the initial capacity and the amount of generated gas and the capacity efficiency when the battery was stored at high temperature in a charged state were good, and the low temperature charge storage characteristics and the operating voltage were almost the same, but the cycle characteristics was slightly decreased, in comparison with Comparative Example 23. In Comparative Example 26, the amount of generated gas when the battery was stored at high temperature in a charged state was very good.

In contrast, in Examples 37 to 45, in which $LiCoO_2$ having an average particle diameter of 4.5 μm to 15.5 μm and a specific surface area of 0.13 to 0.80 m²/g was used as the positive electrode active material and both of a nitrile group-containing compound and a coupling agent were added, superior effects were obtained as follows: the initial capacities were 3601 mAh or more; the low temperature charging characteristics were 87% or more; the cycle characteristic specific capacities were 78% or more; the operating voltages were 3.63 V or more; the amounts of generated gas when the battery was stored at high temperature in a charged state were 6.3 ml or less; and the capacity efficiencies were 66% or more.

The following facts were found by comparing the results of Comparative Examples 16, 19, 22, 25, and 26, in which both a nitrile group-containing compound and a coupling agent were added, with the results of Examples 37 to 43 in the cases where the positive electrode active material was $LiCoO_2$. When the positive electrode active material has an average particle diameter of less than 4.5 μm, even if the specific surface area is within a range of 0.13 to 0.80 m²/g, the low temperature charging characteristics, the cycle characteristic specific capacity, the operating voltage, and the capacity efficiency when the battery is stored at high temperature in a charged state are decreased, and the amount of gas generated when stored at high temperature in a charged state is increased. Furthermore, when the positive electrode active material has an average particle diameter of more than 15.5 μm, even if the specific surface area is within a range of 0.13 to 0.80 m²/g, the low temperature charging characteristics, the cycle characteristic specific capacity, the operating voltage, and the capacity efficiency when the battery is stored at high temperature in a charged state start to further decline in comparison with those of a positive electrode active material having an average particle diameter of 15.5 μm or less.

When the positive electrode active material has a specific surface area of less than 0.13 m²/g, even when the positive electrode active material has an average particle diameter of 4.5 to 15.5 μm, the low temperature charging characteristics, the cycle characteristic specific capacity, the operating voltage, and the capacity efficiency when the battery is stored at high temperature in a charged state are decreased. Furthermore, when the positive electrode active material has a specific surface area of more than 0.80 m²/g, even when the positive electrode active material has an average particle diameter of 4.5 to 15.5 μm, the cycle characteristic specific capacity, the operating voltage, and the capacity efficiency when the battery is stored at high temperature in a charged state are decreased, and the amount of gas generated when stored at high temperature in a charged state is increased.

Accordingly, in the nonaqueous secondary batteries of the invention, it is clear that both a nitrile group-containing compound and a coupling agent are preferably contained and the positive electrode active material preferably has an average particle diameter of 4.5 to 15.5 μm and a specific surface area of 0.13 to 0.80 m²/g.

The measurement results of Examples 46 to 50 and Comparative Examples 27 to 31 will now be discussed. In Examples 46 to 50 and Comparative Examples 27 to 31, $Li_{1/3}Ni_{1/3}Co_{1/3}O_2$, $LiMn_2O_4$, $LiNiO_2$, $LiNi_{0.85}Co_{0.15}O_2$, or $LiCo_{0.99}Al_{0.01}O_2$ was used, and neither a nitrile group-containing compound nor a coupling agent was contained (Comparative Examples 27 to 31), or both a nitrile group-containing compound and a coupling agent were contained (Examples 46 to 50). In Examples 46 to 50 and Comparative Examples 27 to 31, the average particle diameter of the positive electrode active material was within a range of 4.5 to 15.5 μm and the specific surface area was within a range of 0.13 to 0.80 m²/g.

Based on the results listed in Table 3, with any of Li$_{1/3}$Ni$_{1/3}$Co$_{1/3}$O$_2$, LiMn$_2$O$_4$, LiNiO$_2$, LiNi$_{0.85}$Co$_{0.15}$O$_2$, and LiCo$_{0.99}$Al$_{0.01}$O$_2$ used as the positive electrode active material, when both a nitrile group-containing compound and a coupling agent were contained (Examples 46 to 50), the low temperature charging characteristics, the cycle characteristic specific capacities, the operating voltages, the amounts of generated gas and the capacity efficiency after storage at high temperature in a charged state were better than those in the case in which neither a nitrile group-containing compound nor a coupling agent was contained (Comparative Examples 27 to 31), while the initial capacities were slightly decreased. Therefore, it is clear that the results of the study on using LiCoO$_2$ as the positive electrode active material can be equally applied to positive electrode active materials that are commonly used in nonaqueous secondary batteries.

What is claimed is:

1. A nonaqueous secondary battery comprising:
    a positive electrode plate formed with a positive electrode binder layer having a lithium composite oxide as a positive electrode active material;
    a negative electrode plate;
    a separator; and
    a nonaqueous electrolyte, the nonaqueous electrolyte containing a nitrile group-containing compound at a concentration of 0.05% by mass or more with respect to the total mass of the nonaqueous electrolyte,
    the positive electrode active material having an average particle diameter of 4.5 to 15.5 μm and a specific surface area of 0.13 to 0.80 m$^2$/g, and
    the positive electrode binder layer containing at least one of a silane coupling agent and a coupling agent represented by General Formula (I) at a content of 0.003% by mass or more and 5% by mass or less with respect to the mass of the positive electrode active material:

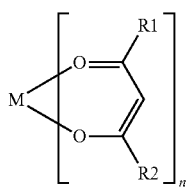

(I)

(where M is one atom selected from Al, Ti, and Zr, each of R1 and R2 is an alkyl group or an alkoxy group having 1 to 18 carbon atoms, and n represents an integer of 1 to 4).

2. The nonaqueous secondary battery according to claim 1, wherein the positive electrode binder layer contains a coupling agent represented by General Formula (I), where M is Al:

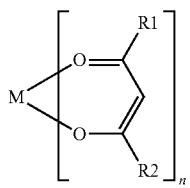

(I)

(where each of R1 and R2 is an alkyl group or an alkoxy group having 1 to 18 carbon atoms, and n represents an integer of 1 to 4).

3. The nonaqueous secondary battery according to claim 2, wherein the coupling agent represented by General Formula (I) is at least one selected from aluminum bisethylacetoacetate monoacetylacetonate, aluminum ethylacetoacetate diisopropylate, aluminum trisethylacetoacetate and aluminum triacetylacetonate.

4. The nonaqueous secondary battery according to claim 1, wherein the positive electrode binder layer contains a coupling agent represented by General Formula (I), where at least one of R1 and R2 is an alkoxy group:

(where M is one atom selected from Al, Ti, and Zr, each of R1 and R2 is an alkyl group or an alkoxy group having 1 to 18 carbon atoms, and n represents an integer of 1 to 4).

5. The nonaqueous secondary battery according to claim 4, wherein the coupling agent represented by General Formula (I) is at least one selected from aluminum ethylacetoacetate diisopropylate, aluminum trisethylacetoacetate, aluminum triacetylacetonate, titanium bis(ethylacetoacetate)diisopropoxide, titanium bisethylacetoacetate bisacetylacetonate, and zirconium tetrakisacetylacetonate.

6. The nonaqueous secondary battery according to claim 1, wherein the nitrile group-containing compound is a dinitrile compound represented by General Formula (II):

NC—R—CN (II)

(where R is an alkyl chain having 2 to 8 carbon atoms).

7. The nonaqueous secondary battery according to claim 6, wherein the dinitrile compound represented by General Formula (II) is at least one selected from adiponitrile, malononitrile, succinonitrile, glutaronitrile, 2-methylglutaronitrile, suberonitrile, sebaconitrile, undecanedinitrile and 3,3'-oxydipropionitrile.

8. The nonaqueous secondary battery according to claim 1, wherein an amount of the nitrile group-containing compound added into the nonaqueous electrolyte is 7.00% by mass or less.

9. The nonaqueous secondary battery according to claim 1, wherein the silane coupling agent contains at least one selected from methyltrimethoxysilane, dimethyldimethoxysilane, methyltriethoxysilane, hexytrimethoxysilane and 3-acryloxypropyltrimethoxysilane.

10. A nonaqueous secondary battery comprising:
    a positive electrode plate formed with a positive electrode binder layer having a lithium composite oxide as a positive electrode active material;
    a negative electrode plate;
    a separator; and
    a nonaqueous electrolyte,
    the nonaqueous electrolyte containing a nitrile group-containing compound at a concentration of 0.05% by mass or more with respect to the total mass of the nonaqueous electrolyte, the positive electrode active material having an average particle diameter of 4.5 to 15.5 pm and a specific surface area of 0.13 to 0.80 m2/g, and the positive electrode binder layer containing at least one of a silane coupling agent and a coupling agent represented by General Formula (I) at a content of 0.003% by mass or more and 5% by mass or less with respect to the mass of the positive electrode active material:

[Formula 7]

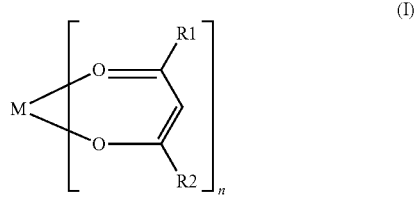
(I)

(where M is Al, each of R1 and R2 is an alkyl group or an alkoxy group having 1 to 18 carbon atoms, and n represents an integer of 1 to 4), wherein the nitrile group-containing compound is a dinitrile compound represented by General Formula (II):

NC—R—CN (II)

(where R is an alkyl chain having 2 to 8 carbon atoms).

11. The nonaqueous secondary battery according to claim 10, wherein the coupling agent represented by General Formula (I) is at least one selected from aluminum bisethylacetoacetate monoacetylacetonate, aluminum ethylacetoacetate diisopropylate, aluminum trisethylacetoacetate and aluminum triacetylacetonate, wherein the dinitrile compound represented by General Formula (II) is at least one selected from adiponitrile, malononitrile, succinonitrile, glutaronitrile, 2-methylglutaronitrile, pimelenitrile, suberonitrile, sebaconitrile, undecanedinitrile and 3,3'-oxydipropionitrile.

12. The nonaqueous secondary battery according to claim 10, wherein an amount of the nitrile group-containing compound added into the nonaqueous electrolyte is 7.00% by mass or less.

13. A nonaqueous secondary battery comprising:
a positive electrode plate formed with a positive electrode binder layer having a lithium composite oxide as a positive electrode active material;
a negative electrode plate;
a separator; and
a nonaqueous electrolyte,
the nonaqueous electrolyte containing a nitrile group-containing compound at a concentration of 0.05% by mass or more with respect to the total mass of the nonaqueous electrolyte,
the positive electrode active material having an average particle diameter of 4.5 to 15.5 pm and a specific surface area of 0.13 to 0.80 m$^2$/g, and
the positive electrode binder layer containing a silane coupling agent at a content of 0.003% by mass or more and 5% by mass or less with respect to the mass of the positive electrode active material,
wherein the nitrile group-containing compound is a dinitrile compound represented by General Formula (II):

NC—R—CN (II)

(where R is an alkyl chain having 2 to 8 carbon atoms).

14. The nonaqueous secondary battery according to claim 13, wherein the silane coupling agent contains at least one selected from methyltrimethoxysilane, dimethyldimethoxysilane, methyltriethoxysilane, hexytrimethoxysilane and 3-acryloxypropyltrimethoxysilane, wherein the dinitrile compound represented by General Formula (II) is at least one selected from adiponitrile, malononitrile, succinonitrile, glutaronitrile, 2-methylglutaronitrile, pimelenitrile, suberonitrile, sebaconitrile, undecanedinitrile and 3,3'-oxydipropionitrile.

15. The nonaqueous secondary battery according to claim 13, wherein an amount of the nitrile group-containing compound added into the nonaqueous electrolyte is 7.00% by mass or less.

* * * * *